UNITED STATES PATENT OFFICE.

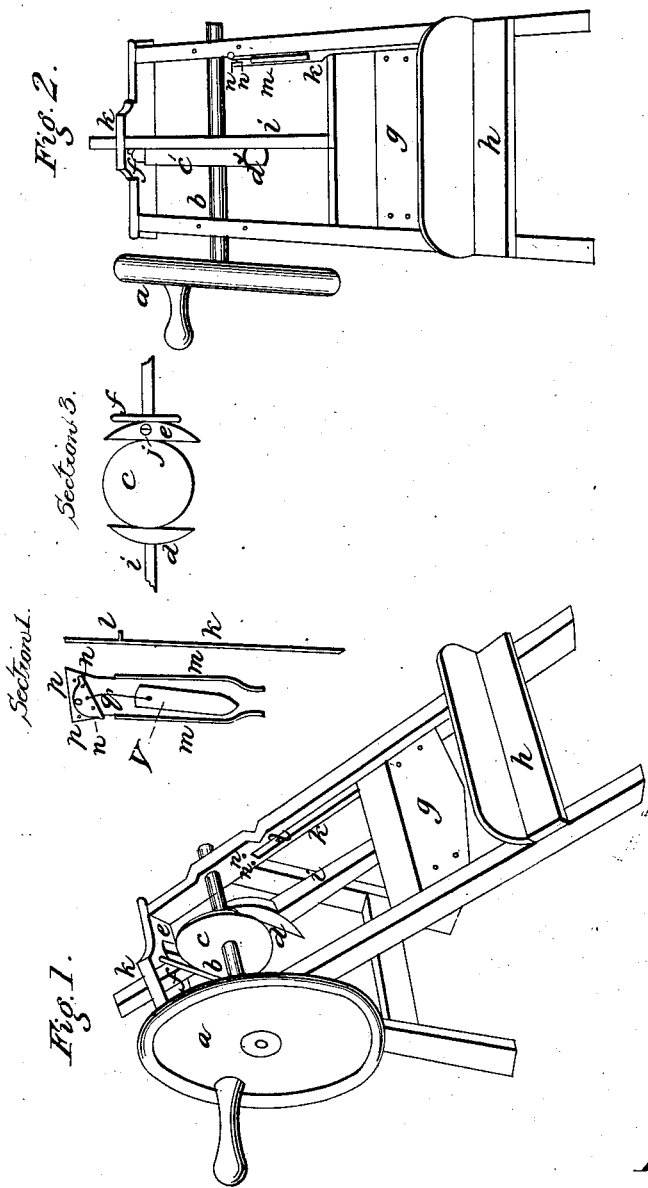

JAS. W. McLEAN AND ALBERT GUMMER, OF INDIANAPOLIS, INDIANA.

SHINGLE-MACHINE.

Specification of Letters Patent No. 28,591, dated June 5, 1860.

*To all whom it may concern:*

Be it known that we, JAMES W. McLEAN and ALBERT GUMMER, of Indianapolis, in the county of Marion and State of Indiana, have invented a new and useful Improvement in Shingle-Machines; and we do hereby declare that the following is a full and exact description thereof, reference being had to the accompanying drawings, making a part of this specification, in which—

Figure (1) is a perspective view and (Fig. 2) an end view, and sectional views (1, 2 and 3) forming part of the same in addition.

The nature of our invention consists in using a vibrator of different construction from that found in any other machine, and also in dispensing with the ordinary cam yoke and substituting therefor cam jaws, which we claim as being superior in several respects to the ordinary yoke, and which are adjusted by means of a tightening screw and key.

To enable others skilled in the art to make and use our invention we will proceed to describe its construction and operation.

We construct our machine with a frame of a diagonal shape as seen at (Fig. 1,) across the top part of which is placed the cam shaft ($b$, $b$,) the cam ($c$, $c$,) working between the jaws ($d$, $d$) and ($e$, $e$) attached to the bar ($i$ $i$) and which works the same up and down in a diagonal direction by the revolving motion of the cam ($c$, $c$,) and the shingle block being placed on its block table and against the breast-plate ($h$, $h$,) the knife ($g$, $g$) fastened to the bar ($i$ $i$) passes through it by the motion of the fly wheel ($a$, $a$) and cam ($c$, $c$) thereby forming the shingle.

($k$, $k$, $k$) is a vibrating bar working on a center pin at the end of the knife ($g$, $g$,) and one end extending from it to connect with the block table working under the breast-plate ($h$, $h$) while the other end extends to between the shears ($m$, $m$) and the reciprocating guide (V) (Sec. 1,) and by the motion of the cam, passes up between the shears ($m$, $m$) and guide (V) until it strikes the pins ($n$ $n$) which action throws the tumbler ($o$, $o$) around, and the spring ($q$) being bent forces the reciprocating guide (V) to the opposite side to where it was previous to the turning of the tumbler ($o$, $o$). The cam then having passed the center the vibrating bar recedes between one of the shears ($m$, $m$) and the guide (V) until it reaches the reversing point of said guide (V) when it passes up and down in precisely the same manner as just described, thus reversing the lower end of the bar ($k$, $k$, $k$) and consequently the block table to which it is attached at every revolution of the cam ($c$, $c$).

(Sec. 3) is a sectional view of the cam jaws ($d$ $d$ $d$) and ($e$, $e$, $e$). In this arrangement we dispense with the ordinary cam yoke the cam jaw ($d$, $d$, $d$) is permanently fixed to the bar ($i$, $i$, $i$) leaving the jaw ($e$ $e$ $e$) capable of being adjusted at pleasure or when the surfaces coming together are so worn as to require it to prevent the jarring of machinery, in a quick and economical way. (J) is the tightening screw and ($f$) is the adjusting key by which it is accomplished.

What we claim as being new and desire to secure by Letters Patent is—

The combination of the vibrator with the shears ($m$, $m$, $m$,) the two pins ($n$ $n$,) tumbler ($o$, $o$,) spring ($q$,) in connection with the reciprocating guide (V), substantially as and for the purpose set forth.

JAMES. W. McLEAN.
ALBERT GUMMER.

Witnesses:
EDWARD GUTH,
EDWIN MAY.